Feb. 7, 1961 R. J. HINES 2,970,349
METHOD AND APPARATUS FOR MOLDING
Filed Sept. 26, 1958 2 Sheets-Sheet 1

INVENTOR.
RUSSELL J. HINES
BY
Bates, Teare + McBean
ATTORNEYS

Feb. 7, 1961 R. J. HINES 2,970,349
METHOD AND APPARATUS FOR MOLDING
Filed Sept. 26, 1958 2 Sheets-Sheet 2

INVENTOR.
RUSSELL J. HINES
BY
Bates, Teare + McBean
ATTORNEYS

United States Patent Office 2,970,349
Patented Feb. 7, 1961

2,970,349
METHOD AND APPARATUS FOR MOLDING

Russell J. Hines, Lakewood, Ohio, assignor to The Hines Flask Company, Cleveland, Ohio, a corporation of Ohio Filed Sept. 26, 1958, Ser. No. 763,582

9 Claims. (Cl. 22—33)

This invention relates in general to the art of founding, and more particularly to an improved method and apparatus for making molds of sand and the like.

It is one of the objects of this invention to provide an apparatus and method whereby a continuous process for providing molds may be carried out with a substantial saving in time and/or labor involved therein, as compared with prior practice.

A further object of the invention is to provide an apparatus and method whereby the production of cope and drag sections of a complete foundry mold can be expeditiously and rapidly formed on a single machine arrangement, thereby providing a considerable saving in labor, foundry space and capital equipment costs.

Another object of the invention is to provide an apparatus and method for producing foundry molds wherein the making of both the cope and drag section is by a single molding apparatus carried on in a continuously repeating operation, and utilizing a single match plate pattern.

A more specific object of the invention is to provide an apparatus and method for producing molds utilizing an oscillating type machine arrangement for producing both the cope and drag sections of the complete mold, and wherein the flask sections with a match plate pattern therebetween, when in assembled condition, are swung from one side of the apparatus, after a filling operation on one of the flask sections, to the other side of the apparatus, where filling operations on the other of the flask sections occurs, to thereby alternately produce a cope mold section and then a drag mold section in a rapid and continuous manner, and without the handling or removal of the pattern plate.

A still further object of the invention is to provide an improved method and apparatus for moving and handling flasks in the production of complete foundry molds and in a continuous cycle of mold producing operations, all of such molding operations occurring on a single apparatus arrangement occupying a minimum of floor space and requiring a minimum of labor.

Other features and advantages of the invention will be apparent from a consideration of the following description taken in conjunction with the accompanying drawings wherein.

Figures 1, 2:
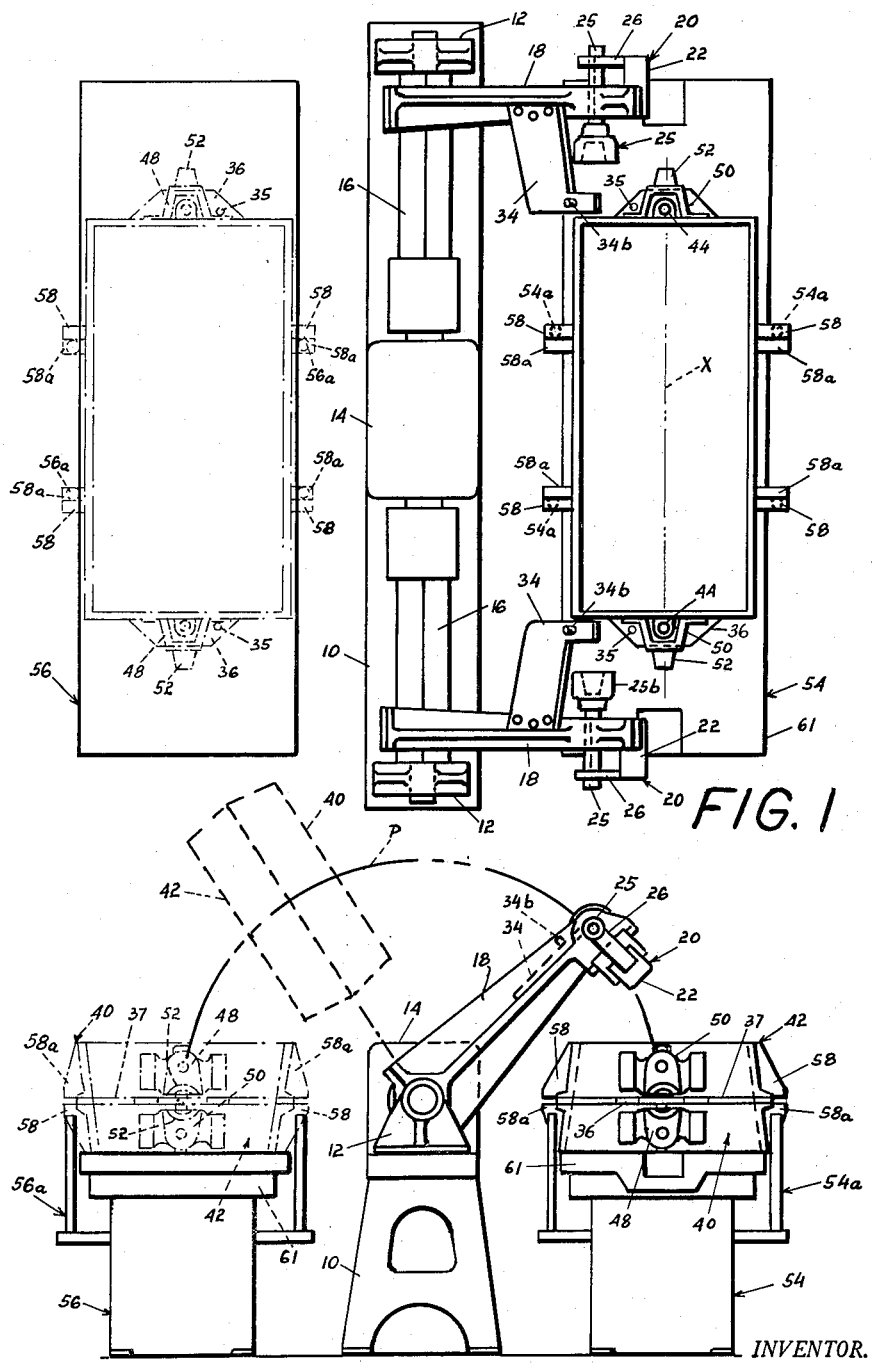
Fig. 1 is a generally diagrammatic, top plan view of an apparatus embodying the invention.
Fig. 2 is an end elevational view of the apparatus illustrated in Fig. 1, with the path of movement of the apparatus and an associated flask assembly being shown in phantom lines.
Figure 3:
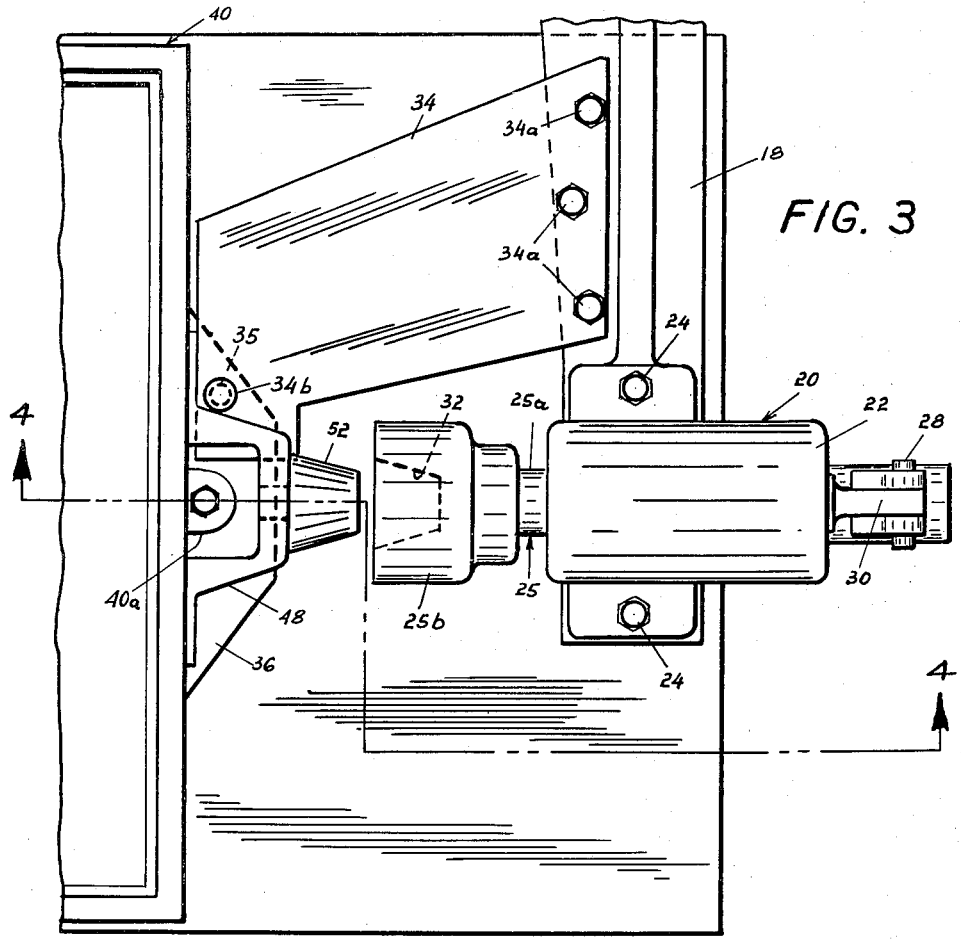

Fig. 3 is an enlarged, fragmentary plan view of the outer end of one of the arms of the Fig. 1 apparatus, illustrating in greater detail the clamping and aligning mechanism for clamping and positioning the flask sections and associated pattern plate together; the position illustrated is that when the swingable portion of the mechanism is on the left hand side (as viewed in Fig. 2) of the apparatus.

Figure 4:
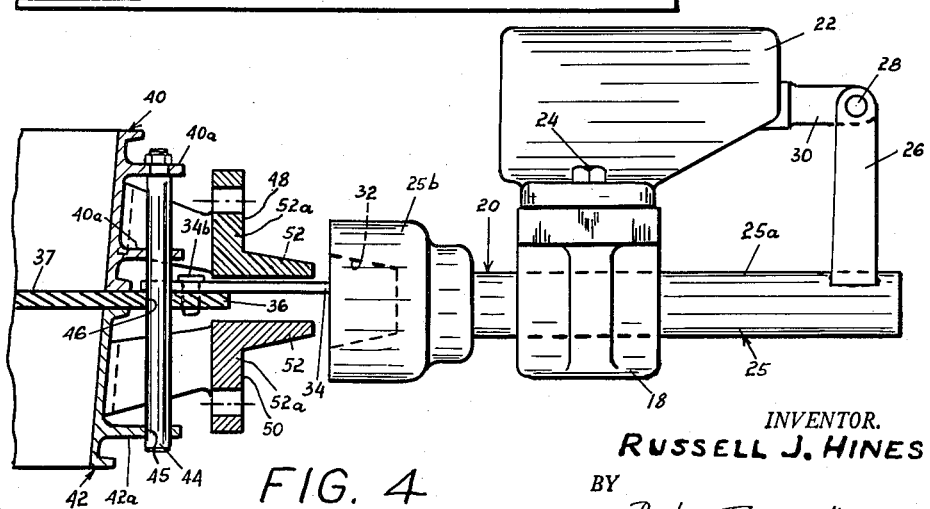

Fig. 4 is a vertical, sectional view taken substantially along the line 4—4 of Fig. 3, looking in the direction of the arrows.

Referring again to the drawings, the machine arrangement illustrated comprises a base 10 supporting spaced, bearing carrying pedestal structure 12. A reversible, preferably fluid powered motor unit 14 is mounted centrally of the base 10, and at opposite ends is drivingly connected to rotary shaft or torque members 16. Shaft members 16 at their outer ends are journaled in the aforementioned bearing structure 12. Extending generally radially outwardly from each shaft element 16 and secured thereto adjacent the outer end of the latter is a swingable or pivotable arm member 18. Each arm member 18 adjacent its outer end comprises a clamping mechanism sub-assembly generally designated by reference No. 20.

The clamping sub-assembly comprises a reversible or double-acting, plunger-type, preferably fluid powered motor unit 22 secured, as by means of fastener elements 24, to the associated arm 18, a clamping element 25 mounted for reciprocable or axial movement in a direction transverse to the associated swingable arm, and a link 26 connected as at 28 to the outer end of the reciprocable plunger 30 of the motor unit 22, and secured at its other end to the clamping element 25, to operatively connect the latter to the former. Clamping element 25 comprises an elongated shank portion 25a which is preferably mounted in bearing means on the associated flask transfer arm 18 for antifrictional movement with respect thereto, and a head portion 25b. Head portion 25b defined a frusto-conical shaped cavity 32 therein, which is adapted to co-act in clamping relation with complementary means on the cope and drag sections of a flask assembly, for holding the latter in positive assembled relation during molding operations, as will be hereinafter described in greater detail. Disposed inwardly from each clamping assembly 20 is an aligning and retaining plate element 34. Element 34 in the embodiment illustrated, is of generally L-shaped configuration in plan view, and is secured by means of fastener elements 34a to the associated arm. The outer end of plate element 34 carries an aligning pin 34b, which is adapted to be received in a complementary opening 35 in laterally extending flange or ear 36 on the match plate pattern member 37.

The general construction of the drag section 40 and the cope section 42 of a complete flask assembly may be of more or less conventional character. In the embodiment illustrated, the end defining walls of the drag flask section include projecting lugs or arms 40a (Fig. 4) which carry and support generally vertically extending pin elements 44. Each of pins 44 is adapted to be received in a complementary aperture 45 in lug 42a on the flask cope section for accurately aligning the flask cope and drag sections in a manner well-known in the art. The pin 44 is also adapted to extend through and in snug engagement with a complementary opening 46 (Fig. 4) in flange portion 36 of the pattern plate 37 to accurately position the latter with respect to the flask sections. The pattern plate openings 46 may be provided with bushings of conventional type for reducing wear and maintaining accurate positioning of the pattern plate with respect to the flask sections.

In accordance with the invention, the end walls of the drag and cope flask sections 40 and 42 are also provided with brackets 48 and 50 respectively, which generally bridge the associated aligning pin 44, as may be best seen in Figs. 3 and 4. Brackets 48 and 50 define laterally projecting, frusto-conical segmental portions 52 which are adapted to be received in recess 32 in cap portion 25b, in tapered, wedging relation upon actuation of the associated motor unit 22 and resultant inward movement of clamping mechanism 25. Brackets 48 and 50 also include abutment portions 52a for positively limiting the inward movement of the clamping mechanism 25 with respect to the segmental portions 52.

Disposed on opposite sides of the oscillating or swingable flask transfer portion of the apparatus are pin-lift, mold drawing machine devices 54 and 56. Devices 54 and 56 may be of more or less conventional type, being preferably fluid actuated, and include upstanding pin-lift mechanism 54a and 56a respectively, which are adapted for engagement with laterally projecting lugs or shoulders 58 and 58a respectively, on the cope and drag flask sections of a complete flask assembly, for lifting the upper most of the flask sections off the lower most section, and thus cause separation of the upper most flask section and associated mold from the pattern plate. As may be best seen from Fig. 1 of the drawings, the abutment shoulders 58 and 58a are off-set with respect to one another in a horizontal direction so as to permit the pins on the associated lift mechanism 54 or 56 to clear the lower flask section and engage the respective abutments on the upper flask section during drawing of the mold from the pattern plate.

Operation of the apparatus in the production of molds is preferably as follows:

An empty drag flask section is positioned on the table portion 61 of lift machine 54 and then motor unit 14 of the swingable flask transfer portion of the apparatus is actuated to cause downward pivotal movement of arms 18 of the apparatus until the clamping elements 25 on the arms are disposed in generally confronting, opposed relation with respect to the segmental lugs 52 on opposite ends of the flask drag section. A match plate pattern 37 is then placed on the top of the drag section with the upstanding aligning pins 44 on the drag section extending through openings 46 in the pattern plate to align the same with the flask section, and with the aligning pins 34b in the retainer plates 34 extending upwardly through the complementary openings 35 in ears 36 of the pattern plate. An empty cope flask section 42 is then positioned on the drag flask section and on the associated pattern plate 37 substantially as illustrated in Fig. 2 of the drawings, the guide pins 44 serving to align the cope flask section with the drag flask section and the pattern plate 37. Motor units 22 on the arms 18 of the apparatus are then actuated, thereby causing inward movement of the clamping elements 25 toward the brackets 48 and 50 and associated frusto-conical segmental portions 52 on the flask sections, thereby causing the head portions 25b of the clamping elements to engage in wedging, holding relation with the associated frusto-conical segmental portions 52, to securely clamp the flask sections together. It will be seen that retaining plates 34 and associated alignment pins 34b insure the proper positioning of the flask assembly on the pin-lift device 54, to provide for the proper and accurate alignment of segmental portions 52 with respect to the associated complementary head portions 25b of the clamping elements 25. In this connection, it will be seen that the horizontal axis X (Fig. 1) of the sectional flask and pattern plate assembly will be generally aligned in both a horizontal and vertical direction with the axes of the cup portions 25b of clamping elements 25 (or will be disposed in both a vertical and a horizontal plane passing through said axes), when aligning pins 34b are coacting with openings 35 in the pattern plate.

Sand is then fed into the open top of the cope flask section 42 by any conventional means, such as a sand slinger mechanism (not shown), thereby forming the cope section of a complete mold. Motor unit 14 is then actuated to cause rotation of shafts 16 and associated pivotal movement of arms 18 towards the other side of the apparatus and along path P, or in other words towards the pin-lift mechanism 56, whereupon the empty drag flask section 40 is located in upper most position and the filled flask cope section containing the finished cope portion of a mold is in lower positon. The empty drag flask section is then filled with sand by means of an aforementioned sand slinger mechanism to form a drag mold section. Next, the motor units 22 are actuated to deactivate the clamping elements 25 to cause the latter to withdraw from coaction with lugs 52, and the drag flask 40 and associated mold is then raised upwardly by means of lift mechanism 56 with the lifting pins 56a thereof engaging shoulders 58a on the drag flask. It will be seen that the pattern plate remains with the lower mold section (i.e. section 42 in Fig. 2 of the drawings) and is positively prevented from upward movement by the overlapping engagement of retainer plates 34 and associated guide pins 34b with end flanges 36 of the pattern plate.

After separation of the drag mold from the pattern plate and the lower cope mold section, the drag mold is set aside, and then another empty drag flask is positioned in inverted position on top of the pattern plate and underlying cope mold and flask section, with the aligning pins 44 on such empty drag section extending through the openings 46, 45 in the pattern plate 37 and cope flask section 42 respectively, to thus align the empty drag flask section with respect to the pattern plate and the flask cope section. Motor units 22 are then actuated to actuate clamping elemens 25, and thus clamp the flask sections and intermediate pattern plate tightly together, and then the upper, empty drag flask section is filled with sand in the aforediscussed manner, to form another drag mold section. Motor unit 14 of the central portion of the apparatus is then actuated to swing arms 18 and clamped flask sections back towards the right-hand side (as viewed in Fig. 2) of the apparatus to the position illustrated in full lines. The cope flask and associated mold is then in uppermost position, and the motor units 22 are actuated to release the clamping elements 25 from coaction with the frusto-conical segments 52 on the flask end walls. The lifting machine 54 is then actuated causing engagement of lift mechanism 54a with shoulders or abutments 58 on the cope flask to thereby draw the cope flask section and associated mold from the pattern plate and underlying drag flask section and associated mold.

Next, an empty cope flask section is positioned on the pattern plate and underlying drag flask section and associated mold, clamping means 25 is actuated to clamp the flask sections to one another, and the process of filling the cope flask with sand to form a cope mold section and the pivoting of the clamped flask and mold sections to the other side (i.e., the left-hand side as viewed in Fig. 2) is repeated, to provide a continuous and rapid procedure for the effective mass production of molds.

It will be seen that the above apparatus and method obviates the necessity of shaking or vibrating and withdrawal of the flask sections from the molds as well as eliminating the necessity of drawing the pattern plate from each individual mold section and resultant individual handling of the pattern, resulting in a great saving in time and labor, thereby providing more competitively priced molds for casting.

From the foregoing discussion and accompanying drawings, it will be seen that the invention provides a novel apparatus and a method for the production of molds of sand and the like for casting, and wherein both the cope and drag mold sections are produced on a single oscillating type apparatus arrangement in an effective and rapid manner. The invention also provides improved mechanism for accurately positioning and clamping the flask sections together, during the mold producing operations on the machine, to thereby provide improved molds for subsequent pouring operations.

The terms and expressions which have been employed are used as terms of description and not of limitation, and there is no intention of excluding any equivalents of the features described or shown, or portions thereof, and it is recognized that various modifications are possible within the scope of the invention claimed.

I claim:

1. In a mold making apparatus for producing two-part sand molds by the match plate method comprising, a base, a pair of laterally spaced arms mounted on a common horizontally extending axis on said base for synchronous swinging movement in generally vertical planes and through arcs of movement of substantially 180°, support means disposed generally stationary with respect to said arms and on opposite sides of said arms, said support means being adapted to receive and support a match plate flask assembly thereon, mold drawing means associated with each of said support means for movement in generally vertical directions for separating the upper flask section from the underlying match plate and lower flask section, reciprocal socket means on each of said arms for movement in directions transverse of the plane of movement of the respective arm, power means for selectively actuating said socket means, said socket means upon actuation thereof being adapted to receive complementary projecting means on opposite ends of the flask sections of the flask assembly for clamping the flask sections and match plate in assembled substantially fixed relation to said arms during swinging movement of the latter to transfer the flask assembly from one of said support means to the other of said support means.

2. In a mold making apparatus in accordance with claim 1 including means on each of said arms adapted for coaction with complementary means on the flask assembly to align and position the flask assembly in horizontal directions on the respective support means and with respect to said socket means in the deactivated condition of the latter.

3. In a mold making apparatus for producing two-part sand molds by the match plate method comprising, a base, a pair of laterally spaced arms mounted on a common horizontally extending axis on said base for synchronous swinging movement in vertical planes through arcs of movement of substantially 180°, support means disposed in relatively stationary relation with respect to said arms and on opposite sides of said arms, said support means being adapted to receive and support a match plate flask assembly thereon, said flask assembly comprising a stacked cope flask section and a drag flask section with a match pattern plate disposed therebetween, and including means for aligning said flask sections and match plate in said stacked relation, mold drawing means comprising a plurality of vertically movable rods associated with each of said support means, each of said flask sections comprising vertically aligned projecting means on opposite ends thereof, said match plate comprising flanges on opposite ends thereof disposed intermediate the respective of said projecting means, portions of each of said flanges extending laterally of said projecting means, reciprocal socket means on each of said arms for movement in directions transverse of the plane of movement of the respective arm, power means on each of said arms for selectively actuating said socket means, said projecting means on said flask sections being receivable in the respective of said socket means to clamp the flask sections and match plate in assembled substantially fixed relation to said arms during swinging movement of said arms to transfer said flask assembly from one of said support means to the other of said support means, means on each of said arms adapted for coaction with complementary means on said flanges of said match plate to align and position the flask assembly in horizontal directions on the support means and with respect to said socket means in the deactivated condition of the latter, and laterally projecting abutment means on each of said flask sections adapted for engagement with said rods on the respective of said mold drawing means to draw the uppermost of said flask sections from the underlying match plate without removing said match plate from the lowermost of said flask sections.

4. In a mold making apparatus in accordance with claim 3 wherein said means on each of said arms for aligning and positioning the flask assembly in horizontal directions comprises a bracket extending inwardly therefrom, a pin projecting transversely from said bracket, each of said end flanges on said match plate having an opening therein formed complementary to said pin, said pin being received in the respective of said openings to align said projecting means on said flask sections with said socket means.

5. In a mold making apparatus in accordance with claim 3 wherein said projecting means on said flask sections and said socket means on said arms comprise complementary tapered surfaces thereon for wedging coaction therebetween upon receipt of said projecting means in the respective of said socket means.

6. A flask section for a match plate flask assembly, said flask section comprising generally upstanding end and side walls defining an enclosed boundary open at the top and bottom thereof, laterally projecting means on each of said flask section end walls adapted to be received in associated socket-type clamping mechanism for holding a pair of stacked flask sections in clamped assembled relation, said projecting means including tapered surfaces thereon for wedging coaction with complementary surfaces on the clamping mechanism, and abutment means projecting laterally from opposing side walls of said flask section adapted for engagement with lifting mechanism for separating said flask section from an underlying flask section of the flask assembly upon deactivation of the clamping mechanism.

7. In a mold making apparatus comprising an oscillatable flask transfer mechanism adapted for vertical swinging movement through an arc of movement of substantially 180° and including opposed power activated reciprocal socket type clamping means on said flask transfer mechanism adapted for coaction with complementary projecting means on opposite ends of an open top and bottom match plate flask assembly to clamp said flask assembly in substantially fixed relation to said transfer mechanism and wherein there is also provided relatively stationary support means disposed on opposite sides of said transfer mechanism at the ends of said arc of movement, said support means being adapted to receive and support the match plate flask assembly, the method of making thereon two-part molds of sand for casting comprising, placing an open top and bottom flask section on one of said support means, placing a match plate pattern on the top of said flask section, placing another open top and bottom flask section on the top of the match plate and underlying flask section, clamping the stacked flask sections and intermediate match plate together by said clamping means and coacting projecting means, filling the upper flask section with sand and compacting the same a predetermined amount to form a stable mold section therein, moving the clamped flask sections and match plate to the other of said support means by actuation of said transfer mechanism while maintaining the fixed relationship between the clamped flask assembly and said transfer mechanism thereby resulting in inversion of said flask assembly, filling the inverted upper flask section with sand and compacting the same therein a predetermined amount to form another stable mold section, unclamping the flask sections and match plate by deactivation of said clamping means, drawing the last mentioned flask section and associated mold vertically upwardly from the match plate and underlying flask section while retaining the match plate with the underlying flask section, placing another empty open top and bottom flask section on top of the match plate and underlying flask section and associated mold, clamping the stacked flask sections and intermediate match plate together by activation of said clamping means, filling the upper flask section with sand and compacting the same a predetermined amount to form another stable mold section therein, moving the flask assembly to said one of said support means by activation of said transfer mechanism while maintaining the aforementioned fixed relationship between the transfer mechanism and the mold assembly thereby resulting in inversion of the clamped flask assembly, unclamping the flask sections by deactivation of said clamping means, and drawing the upper flask section and associated mold from the match plate and underlying flask section and associated mold, while retaining the match plate with the last mentioned flask section.

8. A flask section in accordance with claim 6 wherein said projecting means comprises segmental frusto-conical shaped lugs disposed in aligned relation opposite end walls of said flask section and projecting laterally therefrom.

9. In a method in accordance with claim 7 including the step of aligning in a horizontal direction a horizontal axis of the stacked flask sections with respect to a vertical plane passing through the axis of movement of said clamping means prior to clamping the flask sections together.

References Cited in the file of this patent

UNITED STATES PATENTS

| | | | |
|---|---|---|---|
| 1,726,025 | Harmes | Aug. 27, | 1929 |
| 1,782,762 | Morris | Nov. 25, | 1930 |
| 1,803,406 | Ringle | May 5, | 1931 |
| 1,855,409 | Nicholls | Apr. 26, | 1932 |
| 2,624,084 | Row | Jan. 6, | 1953 |
| 2,686,945 | Williams | Aug. 24, | 1954 |
| 2,726,429 | Duncan | Dec. 13, | 1955 |